(No Model.) 2 Sheets—Sheet 1.

H. W. HILL.
CLUTCH.

No. 516,269. Patented Mar. 13, 1894.

WITNESSES. INVENTOR.
Harry W. Hill
By Wing & Thurston
his attys

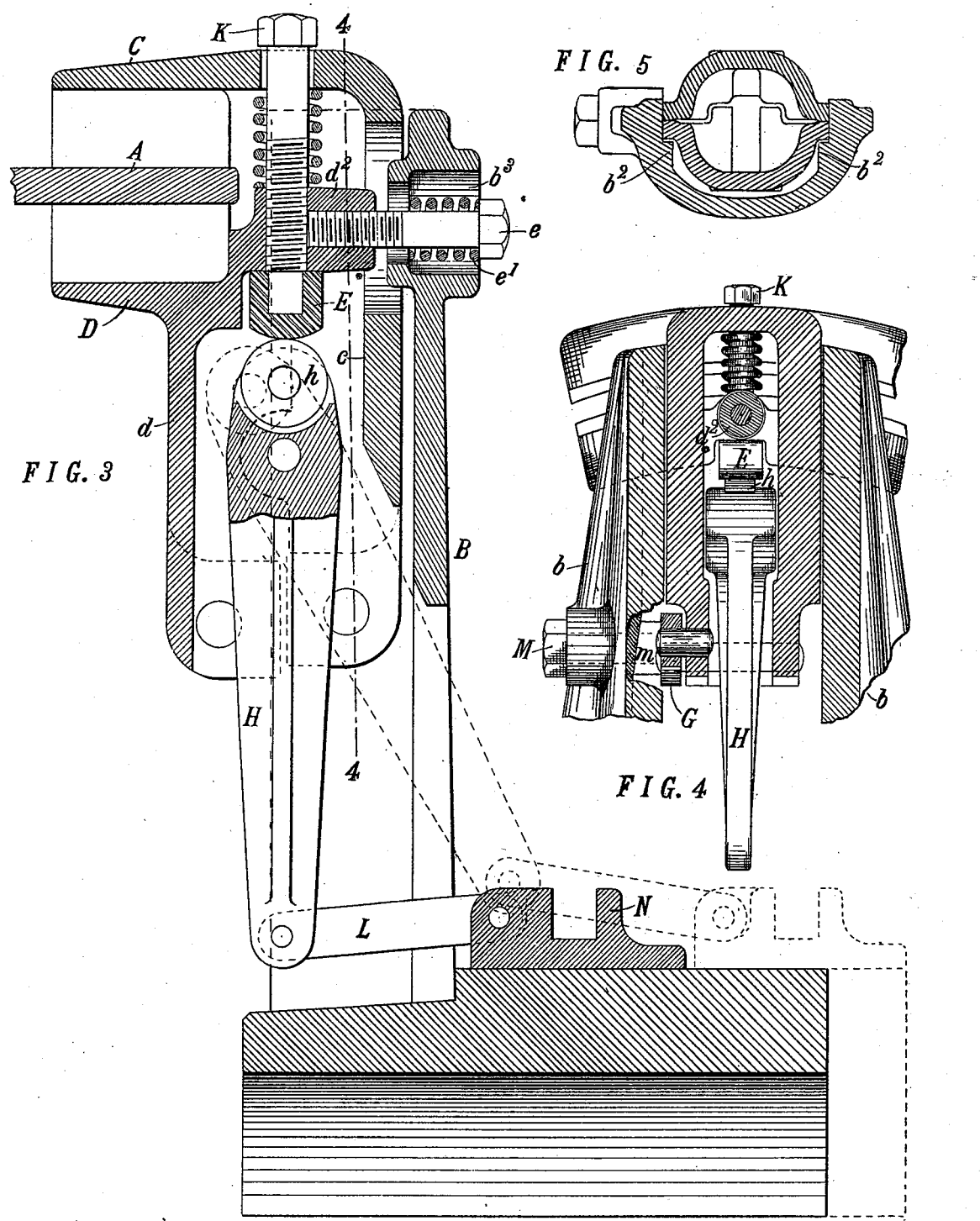

UNITED STATES PATENT OFFICE.

HARRY W. HILL, OF CLEVELAND, OHIO, ASSIGNOR TO F. W. ROBERTS, OF KEY WEST, FLORIDA.

CLUTCH.

SPECIFICATION forming part of Letters Patent No. 516,269, dated March 13, 1894.

Application filed June 26, 1893. Serial No. 478,990. (No model.)

*To all whom it may concern:*

Be it known that I, HARRY W. HILL, a citizen of the United States, residing at Cleveland, in the county of Cuyahoga and State of Ohio, have invented certain new and useful Improvements in Friction-Clutches; and I do hereby declare the following to be a full, clear, and exact description of the invention, such as will enable others skilled in the art to which it appertains to make and use the same.

My invention relates to improvements in the class of friction clutches shown and described in my prior patent, No. 476,640, dated June 7, 1892.

The objects are to simplify the construction, to provide means for more easily removing either or both of the jaws from the clutch arm, when such removal is desirable; and to render more difficult the accidental displacement of the parts of the clutch; and the invention consists in the construction and combination of parts hereinafter described and claimed.

Figure 1:
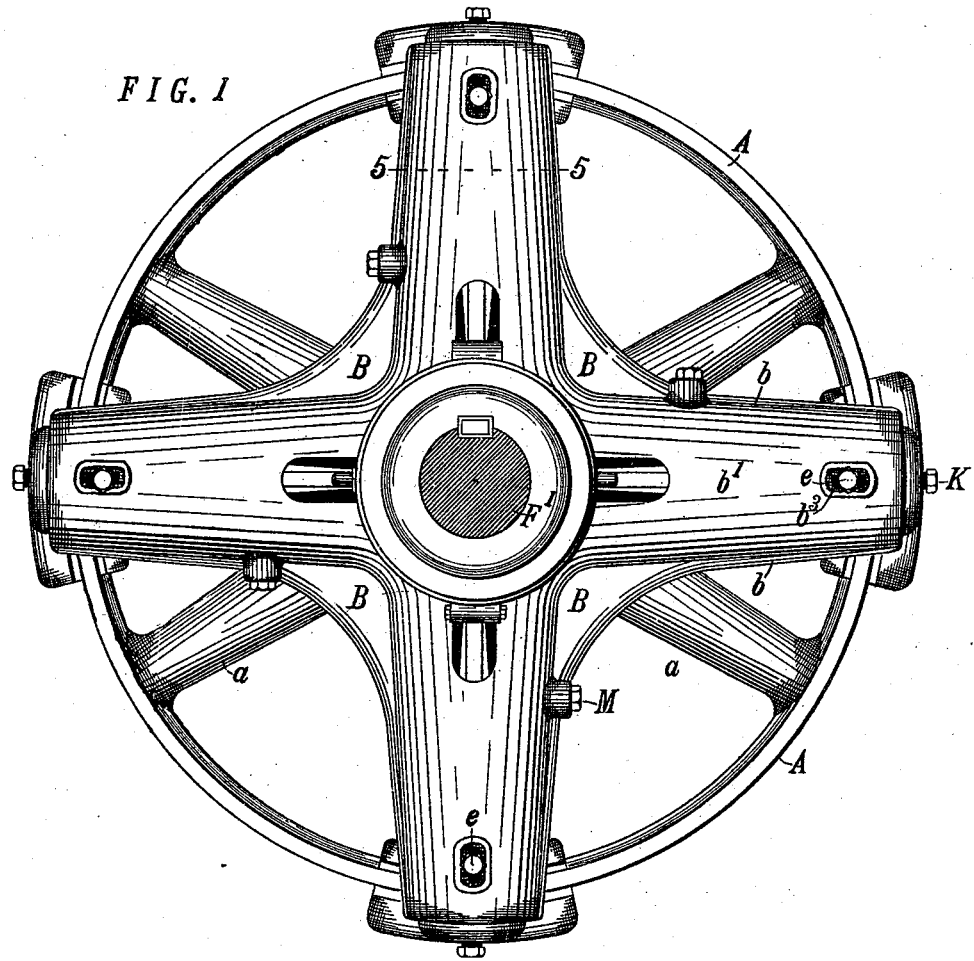
Figure 2:
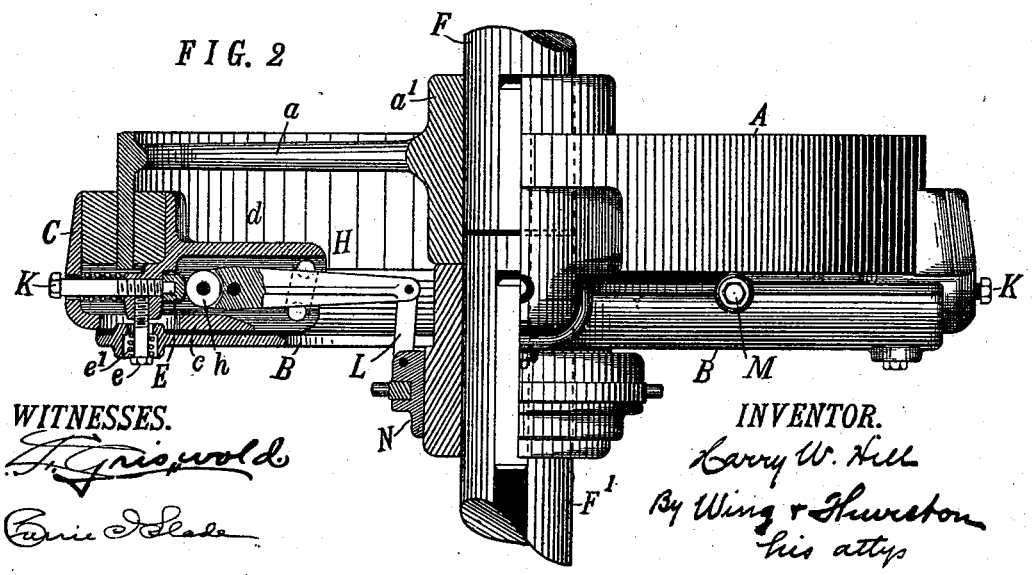

In the drawings Figure 1 is an end view of a shaft and a clutch mounted thereon. Fig. 2 is a side view of the said parts, partly in central vertical section. Fig. 3 is a central sectional view of one clutch arm and the mechanism mounted thereon. Fig. 4 is a sectional view (in the plane indicated by line 4—4 of Fig. 3) of the outer end of one of the clutch arms; and Fig. 5 is a sectional view on line 5—5 of Fig. 1.

Referring to the parts by letters, A represents a cylindrical flange supported by the arms $a$ which are united by a central hub $a'$, said hub being keyed to the shaft F. Fixed to the shaft F' is the clutch frame having as many clutch arms B as it is desired to employ pairs of jaws and associated mechanisms. Each of these arms and the mechanism supported thereon is like every other arm and its mechanism. An arm B consists of two parallel side bars $b\ b$, and a connecting web $b'$. The proximate faces of the side bars are provided each with a longitudinal shoulder $b^2$, against which the shank of the outer jaw is drawn by the action of a spring whereby both jaws are guided in radial paths. The shanks $c$ and $d$ of the two clutch members C and D—or jaws, as they are commonly called, are curved longitudinally so that a recess is left between them into which the operating mechanism projects. The two jaw shanks are pivotally connected with the ends of the lever G, which lever is centrally pivoted on the end of a bolt M which passes through a longitudinal slot in one of the side bars $b$. The position and length of this slot are indicated by the dotted lines, above and below the dotted lines representing the bolt M in Fig. 4. The said bolt is rigidly fixed to said side bar by a nut $m$. In the construction shown in the prior patent mentioned it was found difficult to screw up this nut so tight that it would not slip on the clutch arm under the influence of centrifugal force developed when the clutch is running at high speed. To prevent this action I bevel the inner side of the side bar substantially as shown in Fig. 4, and also provide the nut with a beveled face which bears against the beveled part of the side bar. This makes it impossible for the bolt M to be drawn outward.

Projecting from the inner jaw D into the recess between the jaws is a boss $d^2$. An adjusting bolt K passes loosely through a hole in the outer jaw and is screwed longitudinally through this boss, and its inner end enters the recess between the jaws. This inner end of the bolt is cylindrical and without screw threads; and it enters a socket in the thrust block E which has a convex end. The lever H lies in the recess between the jaw shanks and it is pivoted to the outer jaw. On the outer end of the lever H a friction roller $h$ is mounted, and this roller engages the inner convex end of the block E. The inner end of the lever H is connected by means of a link L with the sliding sleeve N. When, by the movement of the sleeve N, the lever H is moved toward a radial position, its end presses against the block E and said block and the pivot of the lever in the outer jaw are moved apart, and thereby the jaws C and D are moved toward each other. By reason of the described connection of the jaw shanks with lever G the two jaws likewise move toward the interposed flange A. A coil spring is placed between the outer jaw, and the boss $d^2$, being held in place by its position around the bolt K, this spring exerts its force endwise to move said jaws apart. The bolt K is held in any desired position relative to the boss $d^2$ by a set bolt $e$. The bolt extends through a longitudinal slot $b^3$ in the clutch arm; and a spring $e$, which surrounds said bolt, thrusts endwise against the head of the bolt and the clutch arm, and thereby the inner jaw shank is drawn against the outer jaw shank, and the latter is drawn and held against the shoulders $b^2$ on the side bars of the clutch arm. If the two bolts M and $e$ are removed, the two jaws may be taken sidewise from the clutch arm, instead of endwise, as was necessary in the clutch described in the prior patent mentioned; because in the clutch shown in said patent the shanks of the jaws lay in grooves, while in the present case they are held against the shoulders $b^2$ only. Moreover in the clutch shown in the prior patent both jaws were connected with operating lever H, and it was practically impossible to disconnect them, without removing both jaws and operating mechanism from the clutch arm, because of the right and left threads on screw K. In the present clutch there is no positive connection between the inner jaw and operating mechanism, and therefore the inner jaw, when disconnected from lever G, may be removed without removing or disconnecting any other part. This is often found to be a great advantage to the user, wherefore the described construction is much preferable. It is also preferable because the parts constituting the clutch may be more easily assembled than in the older construction.

Having described my invention, I claim—

1. In a friction clutch in combination, a clutch arm consisting of two parallel side bars, one of which is longitudinally slotted and is beveled on its inner side adjacent to the slot, a pair of jaws mounted on said arm, a lever pivotally connected with said two jaws, a bolt passing through said slotted side bar and serving as a pivot for said lever, and a nut having a beveled face which engages with the beveled side bar, substantially as and for the purpose specified.

2. In a friction clutch, in combination, a clutch arm, a pair of jaws mounted thereon having curved shanks whereby a recess is left between them, the inner jaw having a boss which lies in said recess, an adjustment bolt which screws through said boss, a thrust block having a socket which receives the end of said bolt, a lever pivoted to the outer jaw and engaging at its outer end with the thrust block, and mechanism for actuating the inner end of said lever, substantially as and for the purpose specified.

3. In a friction clutch, in combination, a clutch arm, a pair of jaws mounted thereon having curved shanks whereby a recess is left between them, the inner jaw having a boss which lies in said recess, an adjustment bolt which screws through said boss, a coil spring surrounding said bolt and lying between the outer and inner jaws, a thrust block having a socket which receives the end of said bolt, a lever pivoted to the outer jaw and engaging at its outer end with the thrust block, and mechanism for actuating the inner end of said lever, substantially as and for the purpose specified.

4. In a friction clutch, in combination, a clutch arm, consisting of two parallel side bars and a connecting web, a pair of jaws mounted on said arm, the said web and the shank of the outer jaw being slotted, a bolt passing through said slots and engaging with the inner jaw, and a spring surrounding said bolt and thrusting at its ends against the head of said bolt and the said web respectively, substantially as and for the purpose specified.

In testimony whereof I affix my signature in presence of two witnesses.

HARRY W. HILL.

Witnesses:
E. L. THURSTON,
L. F. GRISWOLD.